(12) United States Patent
Erga

(10) Patent No.: US 6,960,332 B2
(45) Date of Patent: Nov. 1, 2005

(54) PROCESS FOR PURIFYING AQUEOUS BUFFER SOLUTIONS

(76) Inventor: Olav Erga, Eikv. 7, N-7058, Jakobsli (NO)

( * ) Notice: Subject to any disclaimer, the term of this patent is extended or adjusted under 35 U.S.C. 154(b) by 319 days.

(21) Appl. No.: 10/220,691

(22) PCT Filed: Mar. 2, 2001

(86) PCT No.: PCT/NO01/00084
§ 371 (c)(1),
(2), (4) Date: Oct. 25, 2002

(87) PCT Pub. No.: WO01/66235
PCT Pub. Date: Sep. 13, 2001

(65) Prior Publication Data
US 2003/0106852 A1 Jun. 12, 2003

(30) Foreign Application Priority Data
Mar. 6, 2000 (NO) .......................................... 20001137

(51) Int. Cl.$^7$ ............................................... C01B 25/30
(52) U.S. Cl. .................................. 423/308; 423/243.08
(58) Field of Search ................................ 423/308, 312, 423/243.01, 243.08

(56) References Cited

U.S. PATENT DOCUMENTS

| 3,911,093 A | * | 10/1975 | Sherif et al. | 423/574.1 |
|---|---|---|---|---|
| 4,519,994 A | * | 5/1985 | Smalheiser | 423/243.08 |
| 4,559,212 A | * | 12/1985 | Erga | 423/242.3 |
| 4,948,572 A | | 8/1990 | Erga | |
| 5,108,625 A | * | 4/1992 | Erga | 210/767 |
| 6,096,239 A | * | 8/2000 | Fung et al. | 252/192 |

FOREIGN PATENT DOCUMENTS

WO      8907973      9/1989

* cited by examiner

*Primary Examiner*—Wayne A. Langel
(74) *Attorney, Agent, or Firm*—Wenderoth, Lind & Ponack, L.L.P.

(57) ABSTRACT

The present invention describes a procedure for the removal of sodium sulphate from a phosphate solution that has been used for absorption of $SO_2$ from flue gases, in which a precipitate forms when the absorption solution is regenerated by evaporation. In this procedure a part of the precipitate is separated from its solution and treated with water and $SO_2$ for transformation of disodium-hydrogen phosphate into monosodium dihydrogen phosphate in the aqueous solution. The sodium sulphate remains undissolved and is removed by filtration. The filtrate is then added back to the main process.

6 Claims, No Drawings

PROCESS FOR PURIFYING AQUEOUS BUFFER SOLUTIONS

This application is a 371 of PCT/NO01/00084 filed Mar. 2, 2001.

FIELD OF THE INVENTION

This invention relates to a process for purifying aqueous buffer solutions used for absorption of sulphur dioxide ($SO_2$) from exhaust gases by means of a regenerable $SO_2$ absorption process. The term "purifying" here includes the recovery of valuable buffer compounds from a buffer stream drained from the process solution, in order to avoid that absorbed impurities reach unacceptable high concentrations. The most important impurity in the present case is sodium sulphate ($Na_2SO_4$), but other unwanted compounds may also be present.

BACKGROUND OF THE INVENTION

There is a strong impetus for developing regenerative absorption processes for $SO_2$ recovery from gas flows. The term "regenerative" in this case usually implies that the active absorption solution is regenerated, and thus made ready for reuse. At the same time, the absorbed $SO_2$ is set free in a concentrated, useful form. Such regenerative processes are especially attractive for treating large gas flows with high $SO_2$ concentrations, when the otherwise commonly used lime/limestone based processes are less suitable. $SO_2$ recovery is also especially attractive when there is a local demand for $SO_2$, for example for sulphuric acid production, or when there is available a Claus plant for producing elemental sulphur from $H_2S$, such as in oil refineries.

Important problems with regenerative $SO_2$-processes are:

Insufficient chemical stability of the active absorbent, leading to too high reagent consumption.

Insufficient pre-cleaning of the feed gas, which again leads to losses of reagent solution.

The formation of unwanted sulphur compounds by unwanted side reactions, especially sulphate formation by oxidation caused by oxygen being absorbed, from the feed gas.

Under certain conditions, dis-proportioning reactions may occur, producing, for example, thiosulphate.

The unwanted products accumulate in the buffer solution, and have to be removed, in order to avoid operation disturbances caused by precipitation through super-saturation. $SO_2$ oxidation first leads to sulphuric acid, which must be neutralized by addition of a base, for example NaOH, in order to counteract acidification of the buffer. Then sodium sulphate forms.

One possibility of avoiding super-saturation of sodium sulphate is to drain a sufficient stream of buffer slurry from the evaporator. However, this may lead to a substantial consumption of valuable chemicals, and may—in addition—represent a disposal problem.

SUMMARY OF THE INVENTION

The goal of the present invention is to develop a new and simple method for purifying the buffer solution, without the drawbacks mentioned above. The present invention combines the use of a chemically completely stable buffer system for $SO_2$ absorption, with a method for selective removal of sodium sulphate.

The aqueous buffer system utilized in the absorption process consists of concentrated sodium phosphates. The use of sodium phosphates for selective $SO_2$ absorption has been known from earlier patent literature. Furthermore, it is known that normally very little sulphate formation through oxidation occurs in such solutions. Nevertheless, some sodium sulphate is expected to appear, caused by the presence of some $SO_3$ in the feed gas. This $SO_3$ has to be neutralized by means of a Na-base.

An obvious procedure for keeping the sulphate concentration low enough is to withdraw a little stream of buffer solution, and substitute it with fresh buffer. For a 500 $MW_e$ power plant with 0.25 vol.-% $SO_2$ in the flue gas, the sulphate production will be about 2.0 kmol/h when the sulphate formation rate corresponding to 2% of the $SO_2$ absorbed. If the sulphate concentration is then to be controlled only by withdrawal of process buffer, 4 $m^3$/h must be removed in order to keep the sulphate at 0.5 $kmol/m^3$. With typically 3 $kmol/m^3$ of $Na_2HPO_4$ in the buffer, with a price set at USD 1.74 per kilo, alone the loss of $Na_2HPO_4$ will amount to USD 3000 per hour. Such draining of buffer thus leads to a high operating cost. Added to this comes the expected environmental problem associated with disposal of the resulting sodium sulphate-sodium phosphate mixture. This example shows that there is a need for a method for selective removal of $Na_2SO_4$, without substantial loss of valuable buffer.

Up till now, separating sodium sulphate from the process solution with sufficient selectivity towards sodium phosphate solution and with acceptable expenditures, has met with significant difficulties, and so has the disposal of the solids removed.

The following reactions are utilized in the known phosphate-based $SO_2$ process:

$$SO_{2(g)} = SO_{2(l)}$$

$$SO_{2(l)} + 2H_2O = H_3O^+ + HSO_3^-$$

$$H_3O^+ + HPO_4^{2-} = H_2O + H_2PO_4^-$$

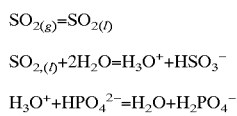

The mechanism is that the relatively basic mono-hydrogen-phosphate ions ($HPO_4^{2-}$) react with the acid hydronium ions ($H_3O^+$), which are set free when $SO_2$ is transformed into bisulphite ($HSO_3^-$). Thereby, the more acid di-hydrogen-phosphate-ions ($H_2PO_4^-$) are formed. The cation utilized is $Na^+$, which is added in the form of a sodium base, for example NaOH.

U.S. Pat. No. 4,948,572 describes a phosphate process where the regeneration of the buffer solution is by evaporation, whereby the reactions above are reversed, and gaseous $SO_2$ is driven off, together with steam. The steam is then removed by condensation, leaving practically pure, gaseous $SO_2$ as product, ready for production of, for example, liquefied $SO_2$, elemental sulphur, or sulphuric acid. Solid $Na_2HPO_4$ mixed with $Na_2SO_4$ and sodium pyrosulphite ($Na_2S_2O_5$), precipitates in the evaporator. ($Na_2S_2O_5$ is the anhydride of sodium hydrogen sulphite ($NaHSO_3$)). Regenerated buffer is made ready for a new round of absorption by addition of condensate and/or water to the suspension, which is drawn off from the evaporator.

A simple procedure for limiting the sulphate concentration of the buffer solution is to remove part of the precipitate, which forms in the evaporator. However, since this material will often consist of about 60% of sodium phosphate, a substantial loss of valuable material results, and disposal is problematic, especially for large plants with large amounts of solids.

Selective removal of $Na_2SO_4$ with acceptable expenditures, has thus met with considerable difficulties.

One example, which may demonstrate this, is described in NO patent 164218. The process is started with a side-stream S of the $SO_2$-rich buffer coming from the absorption tower and being taken out for treatment. In the first step of the treatment, an adjusted, large part of the water content of this stream is removed by evaporation. Thereby a precipitate, which is relatively rich in $Na_2SO_4$, forms. Different extents of the evaporation were tested, in order to find the most promising composition of the precipitate. In a further detailed example, 1411 gram of water was evaporated, together with 79.7 gram of $SO_2$. The evaporation was performed at atmospheric pressure, and the amount of water evaporated represented 62% of the water content at the start. The precipitate was separated from the suspension by filtration, and contained 46% $Na_2SO_4$, 26% $Na_2HPO_4$, and 14% $Na_2S_2O_5$, beside some water. 65% of the start content of the $Na_2SO_4$ in the buffer feed to the evaporator was found in the filter cake. A relatively moderate selectivity thus resulted, leading to a correspondingly high consumption of chemicals. In addition, the procedure followed involves a separate evaporation operation, which significantly adds to the cost.

There is now found a new and unexpected simple procedure whereby a substantial more selective removal of sodium sulphate from the phosphate buffer is accomplished. The new method does not require a separate evaporation step. Also, an unexpectedly high part of the sulphate present at start, is present in the final filter cake, which is separated from the treated $SO_2$ process slurry, ready for disposal.

The present invention represents a procedure for removing sodium sulphate from a sodium phosphate solution, which has been used for absorption of sulphur dioxide from gas flows. A part of the precipitate, which forms when the loaded solution is regenerated by evaporation, is separated from its mother liquor and thereafter treated with water and gaseous sulphur dioxide for transformation of di-sodium-mono-hydrogen-phosphate into mono-sodium-di-hydrogen-phosphate. In this operation, the dominating part of the sodium sulphate remains undissolved, and is then separated from the aqueous phase by, for instance filtration, and the filtrate is returned to the main process.

Following a preferred procedure, the process is carried out at an elevated temperature, preferably below 100° C., and most preferably within the range 40 to 80° C.

The procedure according to the invention requires that part of the precipitate that forms in the evaporation step of the main process in accordance with the U.S. patent mentioned, is separated from its mother liquor, and then treated with water and $SO_2$ at an elevated temperature. The time required for this treatment, is reduced by increased temperature. However, a temperature considerably below 100° C. is preferred, since the $SO_2$-treatment can then be carried out in a simple equipment and at atmospheric pressure. The preferred temperature is in the range 40–80° C. By this treatment, $Na_2HPO_4$ is transformed into $NaH_2PO_4$, which goes into solution, following the gross reaction,

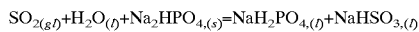

By proper adjustment of the amounts of water and $SO_2$ added, $Na_2SO_4$ may remain almost quantitatively as solid. Thus, it can be selectively separated from the mother liquor and removed from the process, for example, by filtration or by centrifuging. At the same time, the mother liquor, with its content of phosphate and bisulphite, can be returned to the main process.

It has been found that a small amount of sodium pyrosulphite, $Na_2S_2O_5$, will follow the precipitate, which mainly consists of $Na_2SO_4$. The main part of the pyrosulphite, along with mother liquor remaining in the separated solid, can be retrieved by simple water-wash, using a proper amount of water. The temperature of the washing water is preferably kept at the same level as the temperature of the preceding process steps. The washing process should follow the conventional procedure, whereby the solid remaining after washing, is separated by filtration or centrifuging. The filtered washing water is returned to the main process along with the mother liquor.

The importance of the invention is illustrated by the following example:

The phosphate process is used for recovering 1.5 kmol/h of $SO_2$ by absorption from incinerated tail gas in a sulphur recovery plant (Claus plant), 1.5 m³/h of $SO_2$-rich phosphate solution goes to the evaporator, where $SO_2$ is driven off together with steam. Along with this, a precipitate forms, in the amount of 185 kg/m³ $SO_2$-rich feed solution. Analysis of the separated solid after drying, showed 24 weight-% of $Na_2SO_4$. The corresponding total amount of precipitated $Na_2SO_4$ is 1.5*185*0.24=66.6 kg/h, which is equivalent with 66.6/142=0.469 kmol/h.

It must be added that the sulphate concentration of the phosphate buffer of the main process, was kept at about 0.5 kmol/m³, by continuously withdrawing solids from the evaporated slurry. 2% oxidation of the amount of $SO_2$ recovered gives a sulphate generation rate of 1.5*0.02=0.03 kmol/h. Keeping the sulphate concentration at 0.5 kmol/m³, then requires only (0.030/0.469)*100=6.4% of the precipitate of the main process to be treated. However, with about 60 weight-% of sodium phosphate in this solid, it is realized that a process separating the phosphate so that it can be returned to the main process, is of considerable interest: The phosphate saved represents a substantial value, and it reduces a problem of deposition.

The procedure according with the present invention shall now be illustrated by means of the following and not-limiting example:

EXAMPLE

An experiment was performed in order to show the advantages of the present invention.

Solid particles are removed from the evaporated suspension in the main process by filtration. In the present case, the dried "regeneration-precipitate" composition was 28.3 weight-% $Na_2SO_4$ 60.5 weight-% $Na_2HPO_4$ 7.5 weight-% $Na_2S_2O_5$ All phosphate is here assumed to be $Na_2HPO_4$.

The procedure was the following:

671 gram of precipitate was separated from the $SO_2$ loaded buffer after evaporation to a specific density of 1.90 kg/liter. After being crushed to a small particle size, the solid was transferred to a vessel provided with a heating mantle and a magnetic stirrer. Water kept at 70° C. from a thermostat was circulated through the heating mantle. Then 360 gram of water was added. After 30 minutes of stirring, the addition of finely divided $SO_2$ was sparged into the suspension. The $SO_2$ flow was stopped after 90 minutes. Altogether 161 grams of $SO_2$ was introduced. This amounts to a somewhat lesser amount than required if all phosphate in the starting salt was in the form of $Na_2HPO_4$. It is assumed that some $NaH_2PO_4$ was present at start. After the $SO_2$ treatment, the remaining solid material was separated from its mother liquid by filtration at elevated pressure with nitrogen as driving gas. The pressure filter was of stainless steel, and was placed in a water bath kept at 70° C. The filter cake was washed on the filter with 100 milliliters of water at 70° C. The cake was then analyzed for phosphate and sulphate. The sulphate analysis followed the standard gravimetric procedure after precipitation as barium sulphate, while the determination of phosphate followed a standard calorimetric procedure after dissolving an aliquote in a "P-reagent" solution.

The final pressure-filtered material had the following composition:

79.1 weight-% $Na_2SO_4$
18.0 weight-% $Na_2HPO_4$
5.1 weight-% $Na_2S_2O_5$

Sum 102.2%, which is acceptable. 97.2% of the $Na_2SO_4$ at start was left in the final filter cake, while 89.7% of $Na_2HPO_4$ was found in the filtrate.

What is claimed is:

1. A process for removal of sodium sulphate from a phosphate solution which has been used for absorption of $SO_2$ from flue gases, comprising:

subjecting the phosphate solution to evaporation to form a precipitate containing di-sodium-hydrogen-phosphate, separating a part of the precipitate from the phosphate solution, treating the separated precipitate with water and $SO_2$ to transform the di-sodium-hydrogen-phosphate into mono-sodium-di-hydrogen-phosphate in aqueous solution, wherein the aqueous solution contains undissolved sodium sulphate and optionally undissolved sodium pyrosulphite/sodium hydrogen sulphite, removing the undissolved sodium sulphate by filtration to form a filtrate, and adding the filtrate back into the phosphate solution for absorption of $SO_2$ from flue gases.

2. The process of claim 1, further comprising treating the part removed by filtration with water to dissolve and recover the sodium pyrosulphite/sodium hydrogen sulphite.

3. The process of claim 1, wherein the treatment of the separated precipitate is carried out at a temperature below 100° C.

4. The process of claim 3, wherein the treatment of the separated precipitate is carried out at temperatures between 40 and 80° C.

5. The process of claim 2, wherein the treatment of the separated precipitate is carried out at a temperatures below 100° C.

6. The process of claim 5, wherein the treatment of the separated precipitate is carried out at temperatures between 40 and 80° C.

* * * * *